(12) United States Patent
Ge et al.

(10) Patent No.: US 10,685,244 B2
(45) Date of Patent: Jun. 16, 2020

(54) SYSTEM AND METHOD FOR ONLINE REAL-TIME MULTI-OBJECT TRACKING

(71) Applicant: TuSimple, Inc., San Diego, CA (US)

(72) Inventors: Lingting Ge, San Diego, CA (US); Pengfei Chen, San Diego, CA (US); Panqu Wang, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 48 days.

(21) Appl. No.: 15/906,561

(22) Filed: Feb. 27, 2018

(65) Prior Publication Data
US 2019/0266420 A1 Aug. 29, 2019

(51) Int. Cl.
*G06K 9/00* (2006.01)
*G06N 3/08* (2006.01)
(Continued)

(52) U.S. Cl.
CPC ........... *G06K 9/00805* (2013.01); *G06N 3/04* (2013.01); *G06N 3/08* (2013.01); *G06T 7/248* (2017.01);
(Continued)

(58) Field of Classification Search
CPC ....... G06K 9/00805; G06T 7/74; G06T 7/248; G06T 2207/30248; G06N 3/04; G06N 3/08; B60Y 2400/3015
See application file for complete search history.

(56) References Cited

U.S. PATENT DOCUMENTS 6,777,904 B1    8/2004    Degner
7,103,460 B1    9/2006    Breed
(Continued)

FOREIGN PATENT DOCUMENTS

EP    1754179 A1    2/2007
EP    2448251 A2    5/2012
(Continued)

OTHER PUBLICATIONS

Kyoungho Ahn, Hesham Rakha, "The Effects of Route Choice Decisions on Vehicle Energy Consumption and Emissions", Virginia Tech Transportation Institute, Blacksburg, VA 24061, date unknown.
(Continued)

*Primary Examiner* — Ping Y Hsieh
(74) *Attorney, Agent, or Firm* — Paul Liu; Jim Salter

(57) ABSTRACT

A system and method for online real-time multi-object tracking is disclosed. A particular embodiment can be configured to: receive image frame data from at least one camera associated with an autonomous vehicle; generate similarity data corresponding to a similarity between object data in a previous image frame compared with object detection results from a current image frame; use the similarity data to generate data association results corresponding to a best matching between the object data in the previous image frame and the object detection results from the current image frame; cause state transitions in finite state machines for each object according to the data association results; and provide as an output object tracking output data corresponding to the states of the finite state machines for each object.

18 Claims, 6 Drawing Sheets

(51) Int. Cl.
    *G06N 3/04* (2006.01)
    *G06T 7/246* (2017.01)
    *G06T 7/73* (2017.01)

(52) U.S. Cl.
    CPC ......... *G06T 7/74* (2017.01); *B60Y 2400/3015* (2013.01); *G06T 2207/30248* (2013.01)

(56) References Cited

U.S. PATENT DOCUMENTS

| | | |
|---|---|---|
| 7,689,559 B2 | 3/2010 | Canright |
| 7,783,403 B2 | 8/2010 | Breed |
| 7,844,595 B2 | 11/2010 | Canright |
| 8,041,111 B1 | 10/2011 | Wilensky |
| 8,064,643 B2 | 11/2011 | Stein |
| 8,082,101 B2 | 12/2011 | Stein |
| 8,164,628 B2 | 4/2012 | Stein |
| 8,175,376 B2 | 5/2012 | Marchesotti |
| 8,271,871 B2 | 9/2012 | Marchesotti |
| 8,378,851 B2 | 2/2013 | Stein |
| 8,392,117 B2 | 3/2013 | Dolgov |
| 8,401,292 B2 | 3/2013 | Park |
| 8,412,449 B2 | 4/2013 | Trepagnier |
| 8,478,072 B2 | 7/2013 | Aisaka |
| 8,553,088 B2 | 10/2013 | Stein |
| 8,788,134 B1 | 7/2014 | Litkouhi |
| 8,908,041 B2 | 12/2014 | Stein |
| 8,917,169 B2 | 12/2014 | Schofield |
| 8,963,913 B2 | 2/2015 | Baek |
| 8,965,621 B1 | 2/2015 | Urmson |
| 8,981,966 B2 | 3/2015 | Stein |
| 8,993,951 B2 | 3/2015 | Schofield |
| 9,002,632 B1 | 4/2015 | Emigh |
| 9,008,369 B2 | 4/2015 | Schofield |
| 9,025,880 B2 | 5/2015 | Perazzi |
| 9,042,648 B2 | 5/2015 | Wang |
| 9,111,444 B2 | 8/2015 | Kaganovich |
| 9,117,133 B2 | 8/2015 | Barnes |
| 9,118,816 B2 | 8/2015 | Stein |
| 9,120,485 B1 | 9/2015 | Dolgov |
| 9,122,954 B2 | 9/2015 | Srebnik |
| 9,134,402 B2 | 9/2015 | Sebastian |
| 9,145,116 B2 | 9/2015 | Clarke |
| 9,147,255 B1 | 9/2015 | Zhang |
| 9,156,473 B2 | 10/2015 | Clarke |
| 9,176,006 B2 | 11/2015 | Stein |
| 9,179,072 B2 | 11/2015 | Stein |
| 9,183,447 B1 | 11/2015 | Gdalyahu |
| 9,185,360 B2 | 11/2015 | Stein |
| 9,191,634 B2 | 11/2015 | Schofield |
| 9,233,659 B2 | 1/2016 | Rosenbaum |
| 9,233,688 B2 | 1/2016 | Clarke |
| 9,248,832 B2 | 2/2016 | Huberman |
| 9,248,835 B2 | 2/2016 | Tanzmeister |
| 9,251,708 B2 | 2/2016 | Rosenbaum |
| 9,277,132 B2 | 3/2016 | Berberian |
| 9,280,711 B2 | 3/2016 | Stein |
| 9,286,522 B2 | 3/2016 | Stein |
| 9,297,641 B2 | 3/2016 | Stein |
| 9,299,004 B2 | 3/2016 | Lin |
| 9,315,192 B1 | 4/2016 | Zhu |
| 9,317,033 B2 | 4/2016 | Ibanez-guzman |
| 9,317,776 B1 | 4/2016 | Honda |
| 9,330,334 B2 | 5/2016 | Lin |
| 9,342,074 B2 | 5/2016 | Dolgov |
| 9,355,635 B2 | 5/2016 | Gao |
| 9,365,214 B2 | 6/2016 | Ben Shalom |
| 9,399,397 B2 | 7/2016 | Mizutani |
| 9,428,192 B2 | 8/2016 | Schofield |
| 9,436,880 B2 | 9/2016 | Bos |
| 9,438,878 B2 | 9/2016 | Niebla |
| 9,443,163 B2 | 9/2016 | Springer |
| 9,446,765 B2 | 9/2016 | Ben Shalom |
| 9,459,515 B2 | 10/2016 | Stein |
| 9,466,006 B2 | 10/2016 | Duan |
| 9,476,970 B1 | 10/2016 | Fairfield |
| 9,490,064 B2 | 11/2016 | Hirosawa |
| 9,531,966 B2 | 12/2016 | Stein |
| 9,535,423 B1 | 1/2017 | Debreczeni |
| 9,555,803 B2 | 1/2017 | Pawlicki |
| 9,568,915 B1 | 2/2017 | Bemtorp |
| 9,587,952 B1 | 3/2017 | Slusar |
| 9,720,418 B2 | 8/2017 | Stenneth |
| 9,723,097 B2 | 8/2017 | Harris |
| 9,723,099 B2 | 8/2017 | Chen |
| 9,738,280 B2 | 8/2017 | Rayes |
| 9,746,550 B2 | 8/2017 | Nath |
| 2007/0230792 A1 | 10/2007 | Shashua |
| 2008/0249667 A1 | 10/2008 | Horvitz |
| 2009/0040054 A1 | 2/2009 | Wang |
| 2010/0049397 A1 | 2/2010 | Lin |
| 2010/0226564 A1 | 9/2010 | Marchesotti |
| 2010/0281361 A1 | 11/2010 | Marchesotti |
| 2011/0206282 A1 | 8/2011 | Aisaka |
| 2012/0105639 A1 | 5/2012 | Stein |
| 2012/0140076 A1 | 6/2012 | Rosenbaum |
| 2012/0274629 A1 | 11/2012 | Baek |
| 2013/0051613 A1 | 2/2013 | Bobbitt |
| 2014/0145516 A1 | 5/2014 | Hirosawa |
| 2014/0198184 A1 | 7/2014 | Stein |
| 2014/0334668 A1 | 11/2014 | Saund |
| 2015/0062304 A1 | 3/2015 | Stein |
| 2015/0353082 A1 | 12/2015 | Lee |
| 2016/0037064 A1 | 2/2016 | Stein |
| 2016/0094774 A1 | 3/2016 | Li |
| 2016/0129907 A1 | 5/2016 | Kim |
| 2016/0165157 A1 | 6/2016 | Stein |
| 2016/0210528 A1 | 7/2016 | Duan |
| 2016/0321381 A1 | 11/2016 | English |
| 2016/0342837 A1 | 11/2016 | Hong et al. |
| 2016/0375907 A1 | 12/2016 | Erban |
| 2017/0134631 A1* | 5/2017 | Zhao ................ G05D 1/12 |
| 2018/0374233 A1* | 12/2018 | Zhou ................ G06T 7/248 |
| 2019/0065864 A1 | 2/2019 | Yu |

FOREIGN PATENT DOCUMENTS

| | | |
|---|---|---|
| EP | 2463843 A2 | 6/2012 |
| EP | 2463843 A3 | 7/2013 |
| EP | 2761249 A1 | 8/2014 |
| EP | 2463843 B1 | 7/2015 |
| EP | 2448251 A3 | 10/2015 |
| EP | 2946336 A2 | 11/2015 |
| EP | 2993654 A1 | 3/2016 |
| EP | 3081419 A1 | 10/2016 |
| WO | WO/2005/098739 A1 | 10/2005 |
| WO | WO/2005/098751 A1 | 10/2005 |
| WO | WO/2005/098782 | 10/2005 |
| WO | WO/2010/109419 A1 | 9/2010 |
| WO | WO/2013/045612 | 4/2013 |
| WO | WO/2014/111814 A2 | 7/2014 |
| WO | WO/2014/111814 A3 | 7/2014 |
| WO | WO/2014/201324 | 12/2014 |
| WO | WO/2015/083009 | 6/2015 |
| WO | WO/2015/103159 A1 | 7/2015 |
| WO | WO/2015/125022 | 8/2015 |
| WO | WO/2015/186002 A2 | 12/2015 |
| WO | WO/2015/186002 A3 | 12/2015 |
| WO | WO/2016/135736 | 9/2016 |
| WO | WO/2017/013875 A1 | 1/2017 |

OTHER PUBLICATIONS

Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.

Schroff, Florian, Dmitry Kalenichenko, James Philbin, (Google), "FaceNet: A Unified Embedding for Face Recognition and Clustering", CVPR 2015.

Dai, Jifeng, Kaiming He, Jian Sun, (Microsoft Research), "Instance-aware Semantic Segmentation via Multi-task Network Cascades", CVPR 2016.

(56) References Cited

OTHER PUBLICATIONS

Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.
Tian Li, "Proposal Free Instance Segmentation Based on Instance-aware Metric", Department of Computer Science, Cranberry-Lemon University, Pittsburgh, PA., date unknown.
Mohammad Norouzi, David J. Fleet, Ruslan Salakhutdinov, "Hamming Distance Metric Learning", Departments of Computer Science and Statistics, University of Toronto, date unknown.
Jain, Suyong Duff Grauman, Kristen, "Active Image Segmentation Propagation", In Proceedings of the IEEE Conference on Computer Vision and Pattern Recognition (CVPR), Las Vegas, Jun. 2016.
MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.
Kendall, Alex, Gal, Yarin, "What Uncertainties Do We Need in Bayesian Deep Learning for Computer Vision", arXiv:1703.04977v1 [cs.CV] Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.
Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.
P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.

PCT International Search Report and Written Opinion dated May 23, 2019, International application No. PCT/US2019/19839 filing date, Feb. 27, 2019.
Hou, Xiaodi and Zhang, Liqing, "Saliency Detection: A Spectral Residual Approach", Computer Vision and Pattern Recognition, CVPR'07—IEEE Conference, pp. 1-8, 2007.
Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.
Hou, Xiaodi and Zhang, Liqing, "Dynamic Visual Attention: Searching for Coding Length Increments", Advances in Neural Information Processing Systems, vol. 21, pp. 681-688, 2008.
Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.
Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.
Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.
Hou, Xiaodi and Zhang, Liqing, "Color Conceptualization", Proceedings of the 15th ACM International Conference on Multimedia, pp. 265-268, ACM, 2007.
Hou, Xiaodi and Zhang, Liqing, "Thumbnail Generation Based on Global Saliency", Advances in Cognitive Neurodynamics, ICCN 2007, pp. 999-1003, Springer Netherlands, 2008.
Hou, Xiaodi and Yuille, Alan and Koch, Christof, "A Meta-Theory of Boundary Detection Benchmarks", arXiv preprint arXiv:1302.5985, 2013.
Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.
Li, Yanghao and Wang, Naiyan and Liu, Jiaying and Hou, Xiaodi, "Demystifying Neural Style Transfer", arXiv preprint arXiv:1701.01036, 2017.
Hou, Xiaodi and Zhang, Liqing, "A Time-Dependent Model of Information Capacity of Visual Attention", International Conference on Neural Information Processing, pp. 127-136, Springer Berlin Heidelberg, 2006.
Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.
Li, Yanghao and Wang, Naiyan and Liu, Jiaying and Hou, Xiaodi, "Factorized Bilinear Models for Image Recognition", arXiv preprint arXiv:1611.05709, 2016.
Hou, Xiaodi, "Computational Modeling and Psychophysics in Low and Mid-Level Vision", California Institute of Technology, 2014.
Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.
Kyoungho Ahn, Hesham Rakha, "The Effects of Route Choice Decisions on Vehicle Energy Consumption and Emissions", Virginia Tech Transportation Institute, date unknown.

\* cited by examiner

SYSTEM AND METHOD FOR ONLINE REAL-TIME MULTI-OBJECT TRACKING

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2016-2018, TuSimple, All Rights Reserved.

TECHNICAL FIELD

This patent document pertains generally to tools (systems, apparatuses, methodologies, computer program products, etc.) for image processing, object tracking, vehicle control systems, and autonomous driving systems, and more particularly, but not by way of limitation, to a system and method for online real-time multi-object tracking.

BACKGROUND

Multi-Object Tracking (MOT) is a popular topic in computer vision that has received lots of attention over past years in both research and industry. MOT has a variety of applications in security and surveillance, video communication, and self-driving or autonomous vehicles.

Multi-object tracking can be divided into two categories: online MOT and offline MOT. The difference between these two kinds of tracking is that online tracking can only use the information of previous image frames for inference, while offline tracking can use the information of a whole video sequence. Although offline tracking can perform much better than online tracking, in some scenarios such as self-driving cars, only online tracking can be used; because, the latter image frames cannot be used to perform inference analysis for the current image frame.

Recently, some online MOT systems have achieved state-of-the-art performance by using deep learning methods, such as Convolutional Neural Networks (CNN) and Long Short Term Memory (LSTM). However, all these methods cannot achieve real-time speed while maintaining high performance. Moreover, other purported real-time online MOT systems, such as those using only Kalman filters or a Markov Decision Process (MDP), also cannot achieve enough performance to be used in practice. Therefore, an improved real-time online MOT system with better performance is needed.

SUMMARY

A system and method for online real-time multi-object tracking are disclosed. In various example embodiments described herein, we introduce an online real-time multi-object tracking system, which achieves state-of-the-art performance at a real-time speed of over 30 frames per second (FPS). The example system and method for online real-time multi-object tracking as disclosed herein can provide an online real-time MOT method, where each object is modeled by a finite state machine (FSM). Matching objects among image frames in a video feed can be considered as a transition in the finite state machine. Additionally, the various example embodiments can also extract motion features and appearance features for each object to improve tracking performance. Moreover, a Kalman filter can be used to reduce the noise from the results of the object detection.

In the example embodiment, each object in a video feed is modeled by a finite state machine, and the whole tracking process is divided into four stages: 1) similarity calculation, 2) data association, 3) state transition, and 4) post processing. In the first stage, the similarity between an object template or previous object data and an object detection result is calculated. Data indicative of this similarity is used for data association in the second stage. The data association of the second stage can use the similarity data to find the optimal or best matching between previous object data and the object detection results in the current image frame. Then, each object transitions its state according to the results of the data association. Finally, a post processing operation is used to smooth the bounding boxes for each object in the final tracking output.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

As described in various example embodiments, a system and method for online real-time multi-object tracking are described herein. An example embodiment disclosed herein can be used in the context of an in-vehicle control system 150 in a vehicle ecosystem 101. In one example embodiment, an in-vehicle control system 150 with a real-time multi-object tracking module 200 resident in a vehicle 105 can be configured like the architecture and ecosystem 101 illustrated in FIG. 1. However, it will be apparent to those of ordinary skill in the art that the real-time multi-object tracking module 200 described and claimed herein can be implemented, configured, and used in a variety of other applications and systems as well.

Figure 1:
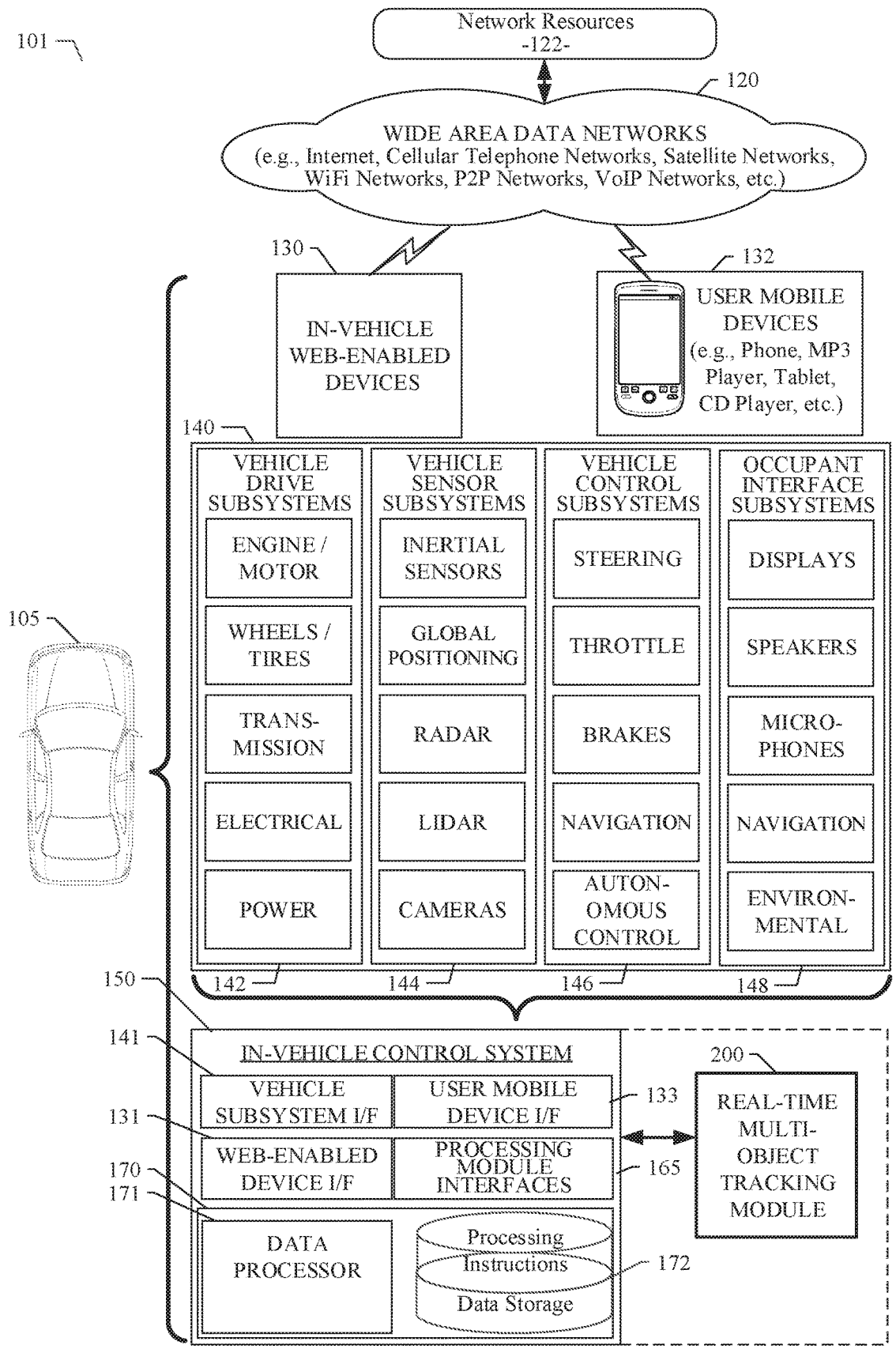
FIG. 1 illustrates a block diagram of an example ecosystem in which an in-vehicle image processing module of an example embodiment can be implemented.

Referring now to FIG. 1, a block diagram illustrates an example ecosystem 101 in which an in-vehicle control system 150 and a real-time multi-object tracking module 200 of an example embodiment can be implemented. These components are described in more detail below. Ecosystem 101 includes a variety of systems and components that can generate and/or deliver one or more sources of information/data and related services to the in-vehicle control system 150 and the real-time multi-object tracking module 200, which can be installed in the vehicle 105. For example, a camera installed in the vehicle 105, as one of the devices of vehicle subsystems 140, can generate image and timing data (e.g., a video feed) that can be received by the in-vehicle control system 150. One or more of the cameras installed in the vehicle 105 can be forward-facing or laterally-facing or oriented to capture images on a side of the vehicle 105. The in-vehicle control system 150 and the real-time multi-object tracking module 200 executing therein can receive this image and timing data or video feed input. As described in more detail below, the real-time multi-object tracking module 200 can process the image input and extract object features, which can be used by an autonomous vehicle control subsystem, as another one of the subsystems of vehicle subsystems 140. The autonomous vehicle control subsystem, for example, can use the real-time extracted object features to safely and efficiently navigate and control the vehicle 105 through a real world driving environment while avoiding obstacles and safely controlling the vehicle.

In an example embodiment as described herein, the in-vehicle control system 150 can be in data communication with a plurality of vehicle subsystems 140, all of which can be resident in a user's vehicle 105. A vehicle subsystem interface 141 is provided to facilitate data communication between the in-vehicle control system 150 and the plurality of vehicle subsystems 140. The in-vehicle control system 150 can be configured to include a data processor 171 to execute the real-time multi-object tracking module 200 for processing image data received from one or more of the vehicle subsystems 140. The data processor 171 can be combined with a data storage device 172 as part of a computing system 170 in the in-vehicle control system 150. The data storage device 172 can be used to store data, processing parameters, and data processing instructions. A processing module interface 165 can be provided to facilitate data communications between the data processor 171 and the real-time multi-object tracking module 200. In various example embodiments, a plurality of processing modules, configured similarly to real-time multi-object tracking module 200, can be provided for execution by data processor 171. As shown by the dashed lines in FIG. 1, the real-time multi-object tracking module 200 can be integrated into the in-vehicle control system 150, optionally downloaded to the in-vehicle control system 150, or deployed separately from the in-vehicle control system 150.

The in-vehicle control system 150 can be configured to receive or transmit data from/to a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with network resources 122, such as websites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing image input or image input analysis. Antennas can serve to connect the in-vehicle control system 150 and the real-time multi-object tracking module 200 with the data network 120 via cellular, satellite, radio, or other conventional signal reception mechanisms. Such cellular data networks are currently available (e.g., Verizon™, AT&T™, T-Mobile™, etc.). Such satellite-based data or content networks are also currently available (e.g., SiriusXM™, HughesNet™, etc.). The conventional broadcast networks, such as AM/FM radio networks, pager networks, UHF networks, gaming networks, WiFi networks, peer-to-peer networks, Voice over IP (VoIP) networks, and the like are also well-known. Thus, as described in more detail below, the in-vehicle control system 150 and the real-time multi-object tracking module 200 can receive web-based data or content via an in-vehicle web-enabled device interface 131, which can be used to connect with the in-vehicle web-enabled device receiver 130 and network 120. In this manner, the in-vehicle control system 150 and the real-time multi-object tracking module 200 can support a variety of network-connectable in-vehicle devices and systems from within a vehicle 105.

As shown in FIG. 1, the in-vehicle control system 150 and the real-time multi-object tracking module 200 can also receive data, image processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, image processing control parameters, and content for the in-vehicle control system 150 and the real-time multi-object tracking module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the real-time multi-object tracking module 200 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the real-time multi-object tracking module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The wheels may represent at least one wheel that is fixedly attached to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices. The vehicle sensor subsystem 144 may also include sensors configured to monitor internal systems of the vehicle 105 (e.g., an 02 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit could be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a steering unit, a throttle, a brake unit, a navigation unit, and an autonomous control unit.

The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the real-time multi-object tracking module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the real-time multi-object tracking module 200, the GPS transceiver, the RADAR, the LIDAR, the cameras, and other vehicle subsystems to determine the driving path or trajectory for the vehicle 105. The vehicle control system 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, means for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide means for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 142, the vehicle sensor subsystem 144, the vehicle control subsystem 146, and the occupant interface subsystems 148.

In addition to the processing instructions, the data storage device 172 may store data such as image processing parameters, training data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 142, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by the vehicle sensor subsystem 144 and the real-time multi-object tracking module 200, move in a controlled manner, or follow a path or trajectory based on output generated by the real-time multi-object tracking module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, and real-time multi-object tracking module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the real-time multi-object tracking module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the real-time multi-object tracking module 200 can be implemented as in-vehicle components of vehicle 105. In various example embodiments, the in-vehicle control system 150 and the real-time multi-object tracking module 200 in data communication therewith can be implemented as integrated components or as separate components. In an example embodiment, the software components of the in-vehicle control system 150 and/or the real-time multi-object tracking module 200 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

System and Method for Online Real-Time Multi-Object Tracking

A system and method for online real-time multi-object tracking are disclosed. In various example embodiments described herein, we introduce an online real-time multi-object tracking system, which achieves state-of-the-art performance at a real-time speed of over 30 frames per second (FPS). The example system and method for online real-time multi-object tracking as disclosed herein can provide an online real-time MOT method, where each object is modeled by a finite state machine (FSM). Matching objects among image frames in a video feed can be considered as a transition in the finite state machine. Additionally, the various example embodiments can also extract motion features and appearance features for each object to improve tracking performance. Moreover, a Kalman filter can be used to reduce the noise from the results of the object detection.

In the example embodiment, each object in a video feed is modeled by a finite state machine, and the whole tracking process is divided into four stages: 1) similarity calculation, 2) data association, 3) state transition, and 4) post processing. In the first stage, the similarity between an object template or previous object data and an object detection result is calculated. Data indicative of this similarity is used for data association in the second stage. The data association of the second stage can use the similarity data to find the optimal or best matching between previous object data and the object detection results in the current image frame. Then, each object transitions its state according to the results of the data association. Finally, a post processing operation is used to smooth the bounding boxes for each object in the final tracking output.

Figure 2:
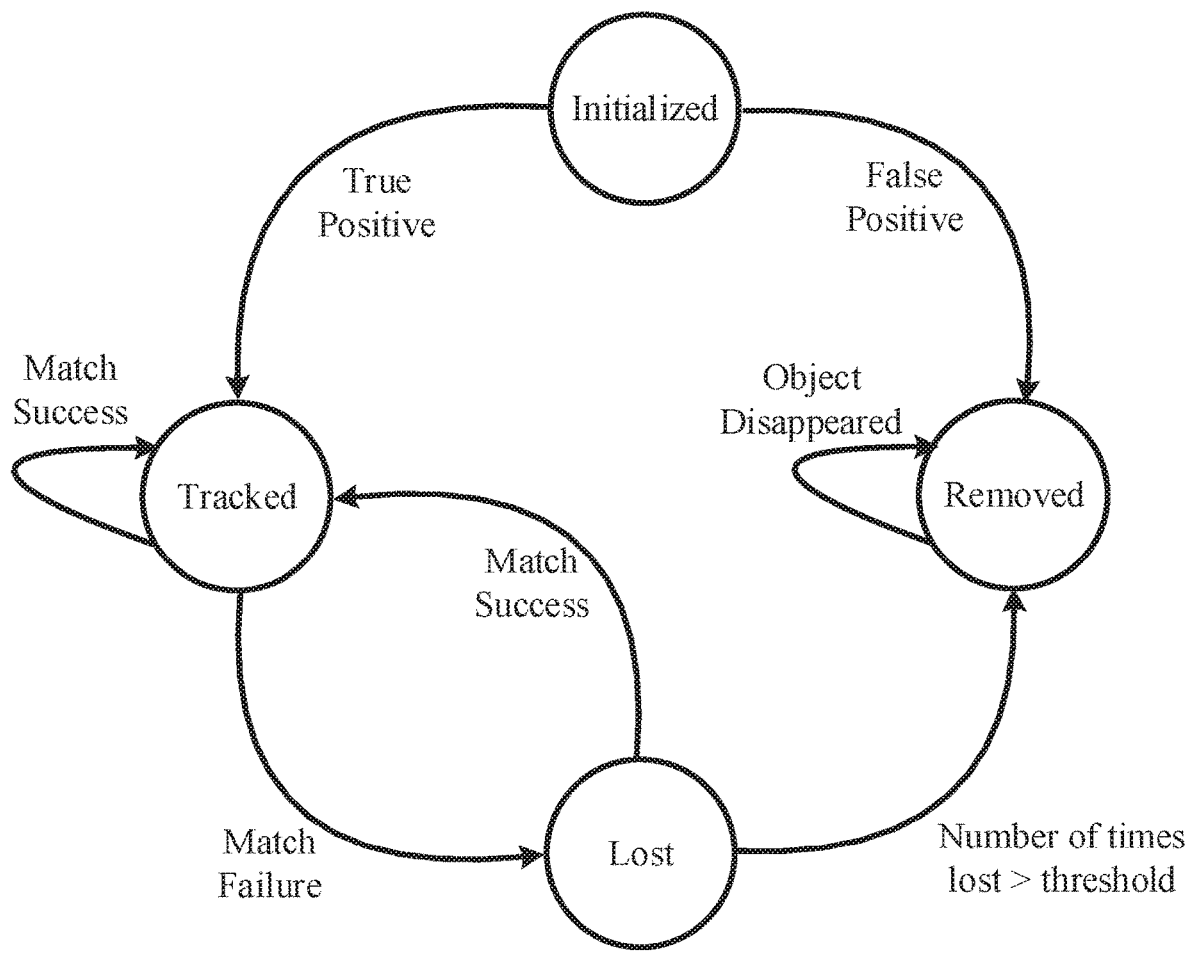
FIG. 2 illustrates a single object modeled by a finite state machine, and a method used in an example embodiment to perform multi-object tracking.

FIG. 2 illustrates a single object modeled by a finite state machine, and a method used in an example embodiment to perform multi-object tracking. The example embodiment can be configured to model each single object by a finite state machine. This model can be used in the example embodiment to perform multi-object tracking as described in more detail below. In an example embodiment illustrated in FIG. 2, there are four FSM states for each object: initialized, tracked, lost, and removed. FIG. 2 shows the four states and how they are related to each other. Each state of the example embodiment is described below with reference to FIG. 2.

Initialized State

A new object detected in the video feed that has never been tracked before is set to the initialized state in its finite state machine. Thus, when a new object is detected by image analysis and object detection, the new object is initialized in the initialized state as a new tracking object. Because there may be some false positives in the detection results, it is possible that the new object is a false positive object detection. In order to avoid false positive object detections, we use a learning based method (such as XGBoost, Support Vector Machine, etc.) to train a classifier (here we call it the initialization classifier), so that we can judge if the detection result is a false positive. The features we use to train the initialization classifier include both vision features and bounding box information related to the detection result. Specifically, given a detection result (e.g., a bounding box position and a confidence score), vision features such as Histogram of Oriented Gradients (HOG) and Scale-Invariant Feature Transform (SIFT) can be extracted from the bounding box of the detected object. Then, the vision feature can be combined with the detection confidence score to feed the classifier.

By using the initialization classifier, we can determine whether a new object detection result is a false positive. If the new object detection result is a real object (e.g., not a false positive), the new object detection result transitions from the initialized state to the tracked state (described below). If the new object detection result is not a real object (e.g., a false positive), the new object detection result transitions from the initialized state to the removed state (also described below).

Tracked State

When a new image frame is received, objects currently in the tracked state need to be processed to determine if the objects currently in the tracked state can remain in the tracked state or should transition to the lost state. This determination depends on the matching detection results from a comparison of a prior image frame with the detection results for the new image frame. Specifically, given a new image frame from the video feed, the example embodiment can match all tracked and lost objects from the prior image frame with the detection results in the new image frame (this is called data association). As a result of this matching or data association process, some previously tracked objects may be lost in the new image frame. Other previously tracked objects may continue to be tracked in the current image frame. Other previously lost objects may re-appear to be tracked again. The detailed matching strategy is described below in connection with the description of the feature extraction and template updating strategies.

Feature Extraction

In an example embodiment, there are two kinds of features used for object data association: motion feature and appearance feature. For motion feature, a Kalman filter is set for each object in tracking history. When a new image frame is received, the Kalman filter can predict a bounding box position for an object in the new image frame according to the trajectory of the object. Then, the example embodiment can determine a similarity (or difference) score between the predicted bounding box position for an object by the Kalman filter and the position of each bounding box for objects detected in the detection results for the new image frame. In a tracking system of an example embodiment, we use Intersection Over Union (IOU) as the similarity score; because, IOU can describe the shape similarity between two bounding boxes. This similarity score is considered as the motion feature or motion similarity of a detected object.

The second part of the feature extraction used in an example embodiment is the appearance feature for each object. The appearance feature is a key feature to distinguish one object from another object. The appearance feature can be extracted by a pre-trained convolutional neural network (CNN). In other embodiments, the appearance feature can be extracted by use of hand-craft features or vision features, such as HOG and SIFT. Different features are suitable for different scenarios or applications of the technology. As such, the methods used for appearance feature extraction can vary to obtain the best performance for different applications. Once the appearance feature for a current object is extracted, the appearance feature of the object can be used to determine an appearance similarity (or difference) as related to the appearance features of previous objects and prior detection results from prior image frames.

Template Updating

If a currently detected object is successfully matched with a bounding box of a previously detected object, the example embodiment can update the appearance feature for the current object as its template. Specifically, the example embodiment can obtain the appearance feature extracted from the matching object bounding box and use the extracted appearance feature as the new template of the current object. In the example embodiment, we do not directly replace the old template with the new appearance feature; instead, the example embodiment keeps several templates (usually three) for each object that has ever been tracked.

When a template is updated, the example embodiment can set a similarity threshold and a bounding box confidence threshold. Only appearance features satisfying the following two conditions can be used to update an old template: First, the similarity score between the appearance feature for the current object and the old template should be less than the similarity threshold. This is because a low similarity score usually means the object has been changed a lot in the current image frame, so that the template should be updated. Second, the detection bounding box confidence level should be higher than the bounding box confidence threshold. This is because we need to avoid false positives in the detection results, and a bounding box with a low confidence level is more likely to be a false positive.

If an appearance feature is selected to be a new template, the example embodiment can determine which of the old templates should be replaced. There are several strategies that can be used for this purpose, such as a Least Recent Use (LRU) strategy, or a strategy that just replaces the oldest template in the template pool.

Lost State

Similar to the tracked state, there are three different kinds of transitions an object can make from the lost state. First, if the object is successfully matched with a detection result in the current image frame, the object will transition back to the tracked state from the lost state. Second, if there is no matching for this object, the object will remain in the lost state. Third, if the object has remained in the lost state for a number of cycles that is greater than a threshold, the object transitions from the lost state to the removed state, where the object is considered to have disappeared.

Because there is no matching detection result for an object in the lost state, the example embodiment does not update the appearance feature (e.g., the template) for these lost objects. However, the example embodiment does need to keep predicting the bounding box position by use of the Kalman filter; because, the example embodiment can use the motion feature for lost objects to perform data association in case the lost object re-appears in a new image frame. This is called a blind update.

Removed State

In an example embodiment, there are only two ways for an object to transition into the removed state. First, an object in the initialized state for which a detection result is considered to be a false positive transitions into the removed state. Second, an object that has remained in the lost state for too cycles transitions into the removed state and is considered to have disappeared from the camera view.

In various example embodiments, a threshold can be used to determine if an object has disappeared. In some embodiments, the larger the threshold is, the higher the tracking performance will be; because, sometimes an object disappears for a while and then may come back into view again. However, a larger threshold leads to a low tracking speed; because, there are more objects in the lost state and more processing overhead is needed to perform object matching during the period of data association. As such, there exists a trade-off between performance and speed.

Tracking Process

Figure 3:
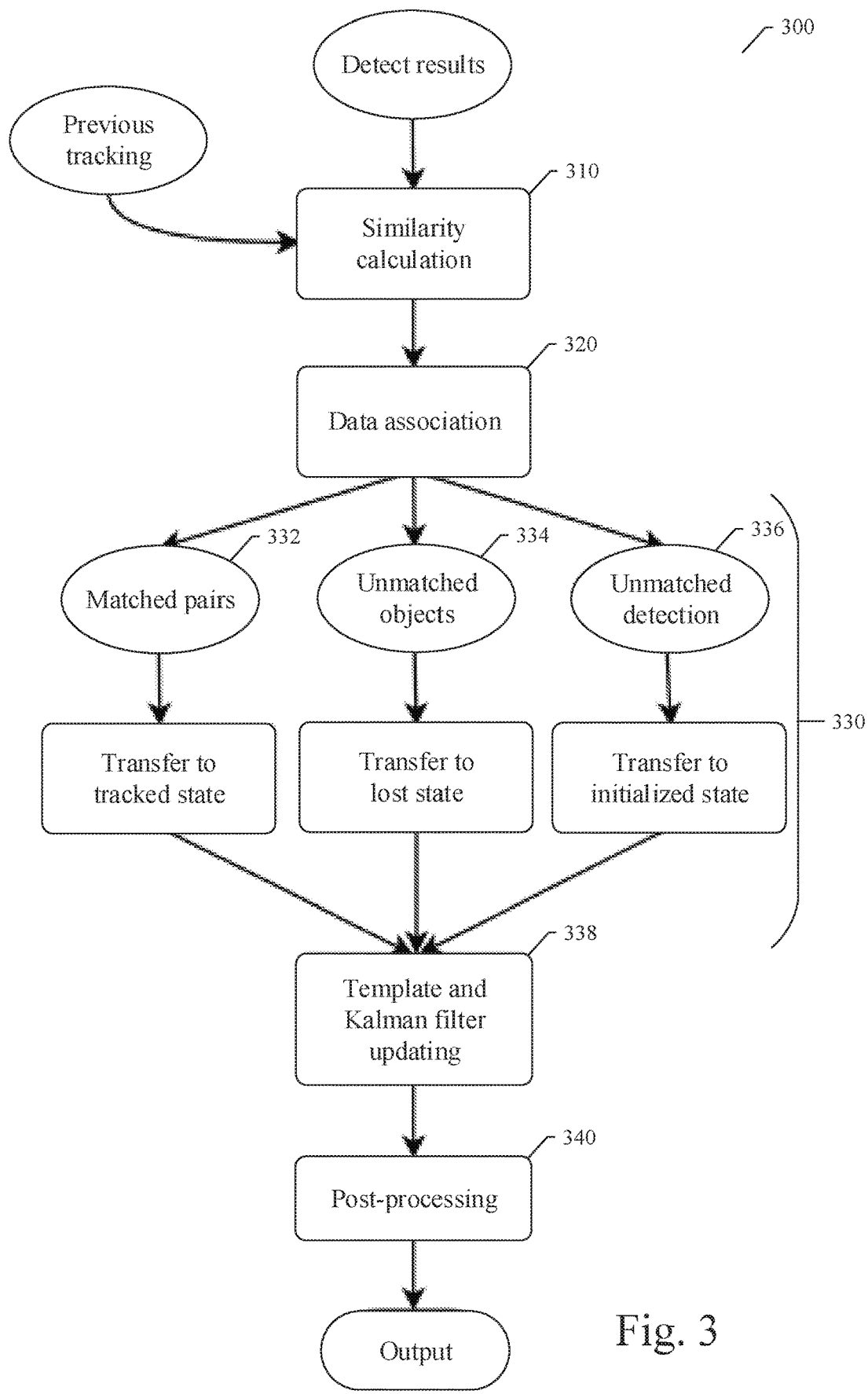
FIG. 3 is an operational flow diagram illustrating an example embodiment of a system and method for online real-time multi-object tracking.

FIG. 3 is an operational flow diagram 300 illustrating an example embodiment of a system and method for online real-time multi-object tracking. In the example embodiment as described above, each object in a video feed can be modeled by a finite state machine. Additionally, the tracking process of an example embodiment can be divided into four stages: 1) similarity calculation, 2) data association, 3) state transition, and 4) post processing. The tracking process of the example embodiment can be used when a new image frame and its corresponding detection results are received. Each of the stages of the tracking process of the example embodiment are described below with reference to FIG. 3.

Similarity Calculation

With reference to block 310 shown in FIG. 3, when a new image frame is received from a video feed, the example embodiment is configured to determine the similarity of each object as related to object detection results. As described above, there are two kinds of features used to determine object similarity in an example embodiment: motion feature similarity and appearance feature similarity. In one example embodiment, motion feature similarity is calculated as the IOU of the prediction of the Kalman filter and the detected object bounding box position. The appearance feature similarity is calculated as the Euclidean distance between the object template and the appearance feature of the object detection result. Because there are several templates retained for each object, the example embodiment can be configured to choose one of the several object templates to be used for data association. There are several strategies that can be used to choose appearance similarity, such as mean or max similarity. Once the similarities for each object have been calculated, the similarities can be used for data association (described below) to find matchings between objects and detection results.

Data Association

With reference to block 320 shown in FIG. 3, the similarities of all pairs of object and detection results have been determined in the similarity calculation stage described above. In the data association phase, the example embodiment is configured to find the best matchings between objects of previous image frames and detection results from a current image frame. In particular, the example embodiment is configured to find the positions of previously detected objects in the current image frame. Because the best matchings require an optimal or best matching solution, an example embodiment can use a Hungarian algorithm (which is also called Kuhn-Munkres algorithm or Munkres assignment algorithm) to find the best matchings, where the similarity scores calculated in a last step of the process are considered as costs or weights in the Hungarian algorithm. The use of the Hungarian algorithm, or other best matching process, can identify pairs of matchings between objects and detection results. Then, the example embodiment can filter out those pairs whose similarity score is less than a predefined threshold. As a result of the data association process, three kinds of results can be obtained: matched pairs of object and detection result 332, unmatched objects 334, and unmatched detection results 336. These results can be used to effect state transitions in the finite state machines for each object as described below.

State Transition

With reference to blocks 330 shown in FIG. 3, after the data association stage is completed, the example embodiment can use the data association results to effect state transitions in the finite state machines for each object. The example embodiment can also initialize new objects for unmatched detection results. As shown in block 332 of FIG. 3, for each object having a matched detection result, the object (or its FSM) transitions to the tracked state. In block 338, the template and the Kalman filter for the object is updated for the corresponding detection result. As shown in block 334 of FIG. 3, for each unmatched object, the object (or its FSM) transitions to the lost state if the prior state of the object was the tracked state. If the prior state of the object was the lost state, the lost object can be processed as described above to determine if the object should be transitioned to the removed state. In block 338, the template and the Kalman filter for the object is updated by blind update. As shown in block 336 of FIG. 3, for each unmatched detection result, the example embodiment can initialize a new object and transition the new object to the initialized state as described above. In block 338, the template and the Kalman filter for the new object is updated for the corresponding detection result.

Post Processing

Because almost all related tracking methods directly use the bounding boxes of detection results as the final output for each image frame, and detection results for each object may be unstable, there may be some variations in the final output. In order to avoid this problem and make the final output smoother, some modifications to the detection results can be made in the example embodiment. Specifically, we can use the weighted average of the detection result and the prediction of Kalman filter as the final tracking output, which can improve the tracking performance both in benchmark and visualization.

Figure 4:
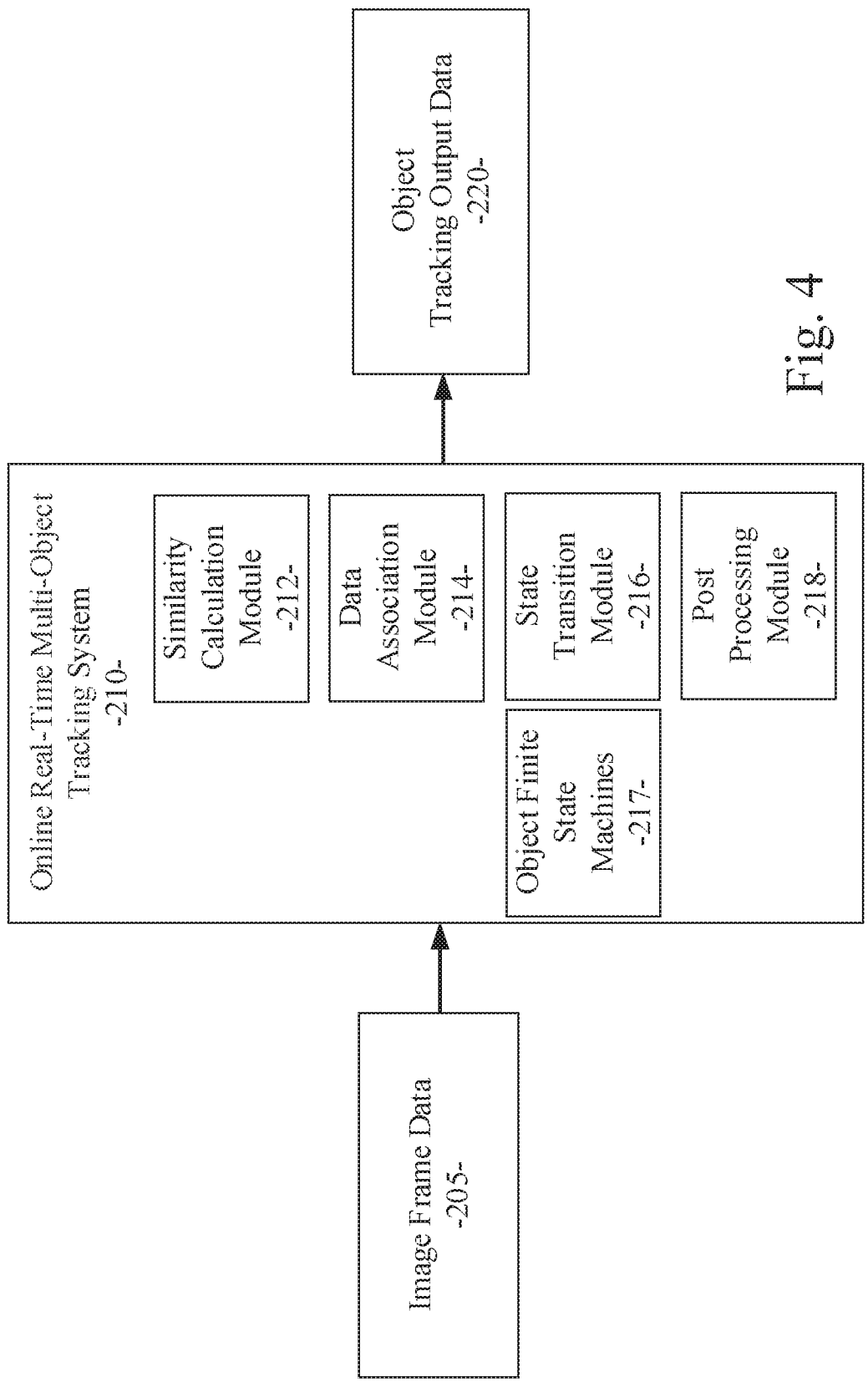
FIG. 4 illustrates components of the system for online real-time multi-object tracking of an example embodiment.

FIG. 4 illustrates components of the system for online real-time multi-object tracking of an example embodiment. Referring now to FIG. 4, an example embodiment disclosed herein can be used in the context of an online real-time multi-object tracking system 210 for autonomous vehicles. The online real-time multi-object tracking system 210 can be included in or executed by the real-time multi-object tracking module 200 as described above. The online real-time multi-object tracking system 210 can include a similarity calculation module 212, a data association module 214, a state transition module 216 with corresponding object finite state machines 217, and a post processing module 218. These modules can be implemented as processing modules, software or firmware elements, processing instructions, or other processing logic embodying any one or more of the methodologies or functions described and/or claimed herein. The online real-time multi-object tracking system 210 can receive one or more image streams or image frame data sets from a camera or other image source of the autonomous vehicle 105. As described above, the similarity calculation module 212 can calculate the similarity between an object template or previous object data and an object detection result. Data indicative of this similarity is used for data association. The data association module 214 can use the similarity data to find the optimal or best matching between previous object data and the object detection results in the current image frame. Then, the state transition module 216 can cause the FSM 217 for each object to transition its state according to the results of the data association. Finally, the post processing module 218 can be used to smooth the bounding boxes for each object in the final object tracking output. The online real-time multi-object tracking system 210 can provide as an output the object tracking output data 220 generated as described above.

Figure 5:
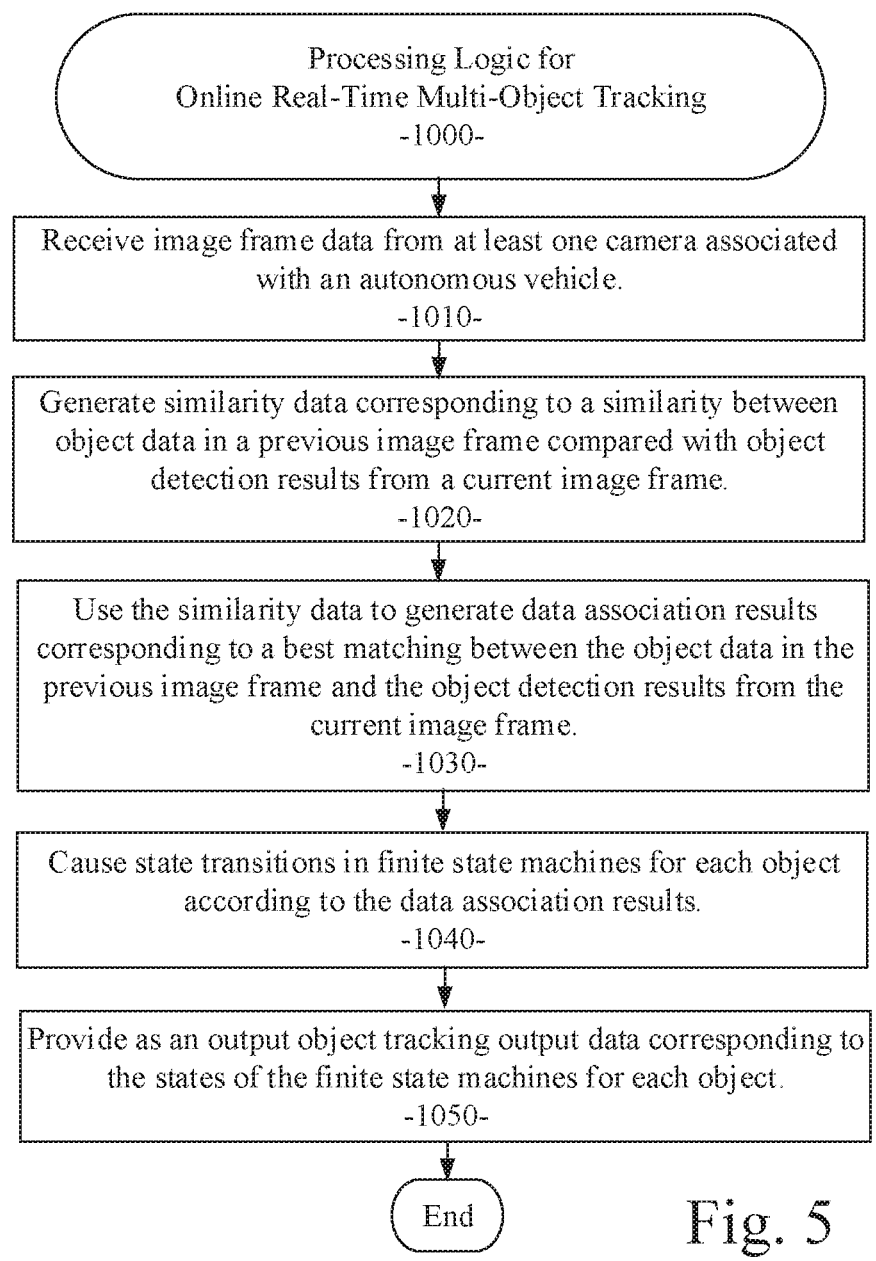
FIG. 5 is a process flow diagram illustrating an example embodiment of a system and method for online real-time multi-object tracking.

Referring now to FIG. 5, a process flow diagram illustrates an example embodiment of a system and method for online real-time multi-object tracking. The example embodiment can be configured to: receive image frame data from at least one camera associated with an autonomous vehicle (processing block 1010); generate similarity data corresponding to a similarity between object data in a previous image frame compared with object detection results from a current image frame (processing block 1020); use the similarity data to generate data association results corresponding to a best matching between the object data in the previous image frame and the object detection results from the current image frame (processing block 1030); cause state transitions in finite state machines for each object according to the data association results (processing block 1040); and provide as an output object tracking output data corresponding to the states of the finite state machines for each object (processing block 1050).

As used herein and unless specified otherwise, the term "mobile device" includes any computing or communications device that can communicate with the in-vehicle control system 150 and/or the real-time multi-object tracking module 200 described herein to obtain read or write access to data signals, messages, or content communicated via any mode of data communications. In many cases, the mobile device 130 is a handheld, portable device, such as a smart phone, mobile phone, cellular telephone, tablet computer, laptop computer, display pager, radio frequency (RF) device, infrared (IR) device, global positioning device (GPS), Personal Digital Assistants (PDA), handheld computers, wearable computer, portable game console, other mobile communication and/or computing device, or an integrated device combining one or more of the preceding devices, and the like. Additionally, the mobile device 130 can be a computing device, personal computer (PC), multiprocessor system, microprocessor-based or programmable consumer electronic device, network PC, diagnostics equipment, a system operated by a vehicle 119 manufacturer or service technician, and the like, and is not limited to portable devices. The mobile device 130 can receive and process data in any of a variety of data formats. The data format may include or be configured to operate with any programming format, protocol, or language including, but not limited to, JavaScript, C++, iOS, Android, etc.

As used herein and unless specified otherwise, the term "network resource" includes any device, system, or service that can communicate with the in-vehicle control system 150 and/or the real-time multi-object tracking module 200 described herein to obtain read or write access to data signals, messages, or content communicated via any mode of inter-process or networked data communications. In many cases, the network resource 122 is a data network accessible computing platform, including client or server computers, websites, mobile devices, peer-to-peer (P2P) network nodes, and the like. Additionally, the network resource 122 can be a web appliance, a network router, switch, bridge, gateway, diagnostics equipment, a system operated by a vehicle 119 manufacturer or service technician, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein. The network resources 122 may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3—MP3, and the like), video (e.g., MP4, and the like), and any proprietary interchange format defined by specific content sites can be supported by the various embodiments described herein.

The wide area data network 120 (also denoted the network cloud) used with the network resources 122 can be configured to couple one computing or communication device with another computing or communication device. The network may be enabled to employ any form of computer readable data or media for communicating information from one electronic device to another. The network 120 can include the Internet in addition to other wide area networks (WANs), cellular telephone networks, metro-area networks, local area networks (LANs), other packet-switched networks, circuit-switched networks, direct data connections, such as through a universal serial bus (USB) or Ethernet port, other forms of computer-readable media, or any combination thereof. The network 120 can include the Internet in addition to other wide area networks (WANs), cellular telephone networks, satellite networks, over-the-air broadcast networks, AM/FM radio networks, pager networks, UHF networks, other broadcast networks, gaming networks, WiFi networks, peer-to-peer networks, Voice Over IP (VoIP) networks, metro-area networks, local area networks (LANs), other packet-switched networks, circuit-switched networks, direct data connections, such as through a universal serial bus (USB) or Ethernet port, other forms of computer-readable media, or any combination thereof. On an interconnected set of networks, including those based on differing architectures and protocols, a router or gateway can act as a link between networks, enabling messages to be sent between computing devices on different networks. Also, communication links within networks can typically include twisted wire pair cabling, USB, Firewire, Ethernet, or coaxial cable, while communication links between networks may utilize analog or digital telephone lines, full or fractional dedicated digital lines including T1, T2, T3, and T4, Integrated Services Digital Networks (ISDNs), Digital User Lines (DSLs), wireless links including satellite links, cellular telephone links, or other communication links known to those of ordinary skill in the art. Furthermore, remote computers and other related electronic devices can be remotely connected to the network via a modem and temporary telephone link.

The network 120 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network may also include an autonomous system of terminals, gateways, routers, and the like connected by wireless radio links or wireless transceivers. These connectors may be configured to move freely and randomly and organize themselves arbitrarily, such that the topology of the network may change rapidly. The network 120 may further employ one or more of a plurality of standard wireless and/or cellular protocols or access technologies including those set forth herein in connection with network interface 712 and network 714 described in the figures herewith.

In a particular embodiment, a mobile device 132 and/or a network resource 122 may act as a client device enabling a user to access and use the in-vehicle control system 150 and/or the real-time multi-object tracking module 200 to interact with one or more components of a vehicle subsystem. These client devices 132 or 122 may include virtually any computing device that is configured to send and receive information over a network, such as network 120 as described herein. Such client devices may include mobile devices, such as cellular telephones, smart phones, tablet computers, display pagers, radio frequency (RF) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. The client devices may also include a wireless application device on which a client application is configured to enable a user of the device to send and receive information to/from network resources wirelessly via the network.

The in-vehicle control system 150 and/or the real-time multi-object tracking module 200 can be implemented using systems that enhance the security of the execution environment, thereby improving security and reducing the possibility that the in-vehicle control system 150 and/or the real-time multi-object tracking module 200 and the related services could be compromised by viruses or malware. For example, the in-vehicle control system 150 and/or the real-time multi-object tracking module 200 can be implemented using a Trusted Execution Environment, which can ensure that sensitive data is stored, processed, and communicated in a secure way.

Figure 6:
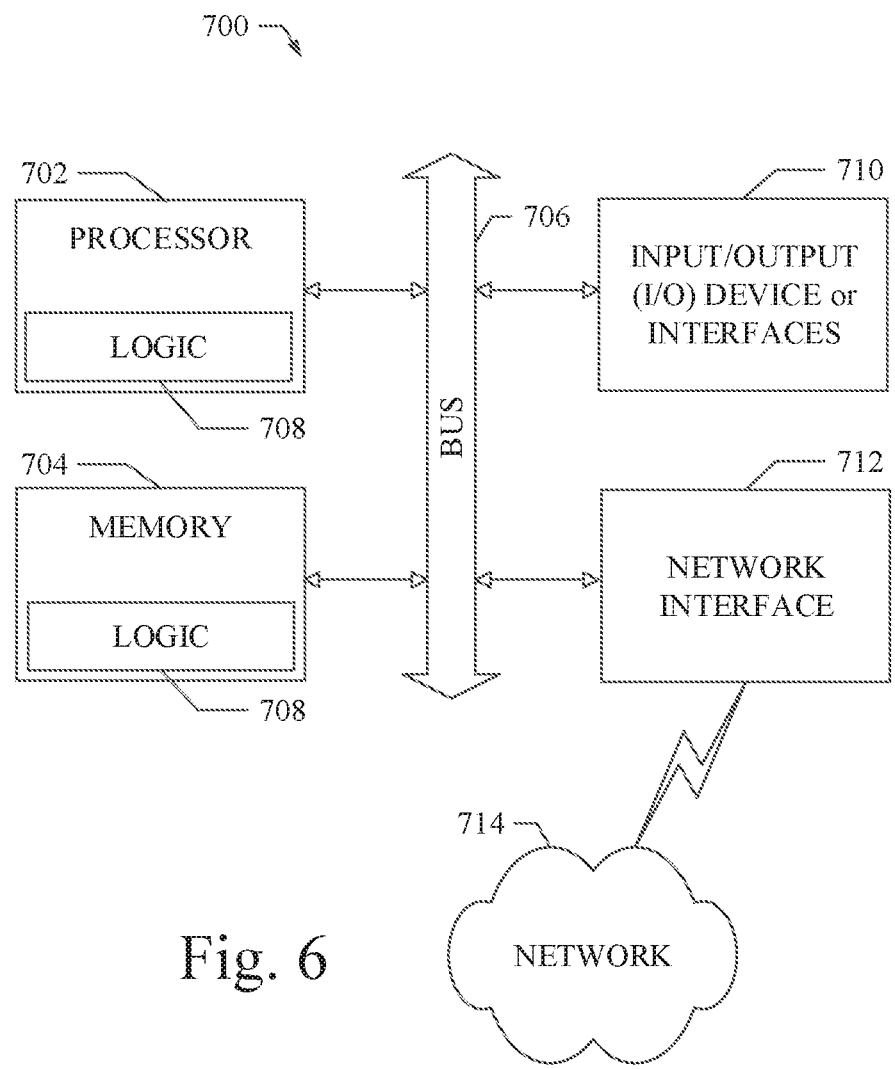
FIG. 6 shows a diagrammatic representation of machine in the example form of a computer system within which a set of instructions when executed may cause the machine to perform any one or more of the methodologies discussed herein.

FIG. 6 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth©, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
    a data processor; and
    an online real-time multi-object tracking system, executable by the data processor, the online real-time multi-object tracking system being configured to perform an online real-time multi-object tracking operation for autonomous vehicles, the online real-time multi-object tracking operation being configured to:
        receive image frame data from at least one camera associated with an autonomous vehicle;
        generate similarity data corresponding to a similarity between object data in a previous image frame compared with object detection results from a current image frame;
        maintain a plurality of different templates for each object in the object data, the plurality of different templates for each object corresponding to different appearance features for each object as extracted from the object detection results;
        update the plurality of templates for each object based on the similarity data;
        use the similarity data to generate data association results corresponding to a best matching between the object data in the previous image frame and the object detection results from the current image frame;
        cause state transitions in finite state machines for each object according to the data association results; and
        provide as an output object tracking output data corresponding to the states of the finite state machines for each object.

2. The system of claim 1 being further configured to create a finite state machine for each new object detected in the object detection results, the finite state machine for each object representing a current object detection state of a plurality of possible object detection states for a corresponding object.

3. The system of claim 1 being further configured to generate the similarity data using motion feature similarity and appearance feature similarity.

4. The system of claim 1 being further configured to generate the similarity data using motion feature similarity based on a prediction of a Kalman filter and a detected object bounding box position.

5. The system of claim 1 being further configured to generate the data association results based on three kinds of results: matched object data with object detection results, unmatched object data, and unmatched object detection results.

6. The system of claim 1 wherein the finite state machines for each object include states from the group consisting of: initialized, tracked, lost, and removed.

7. A method comprising:
    receiving image frame data from at least one camera associated with an autonomous vehicle;
    generating similarity data corresponding to a similarity between object data in a previous image frame compared with object detection results from a current image frame;
    maintaining a plurality of different templates for each object in the object data, the plurality of different templates for each object corresponding to different appearance features for each object as extracted from the object detection results;
    updating the plurality of templates for each object based on the similarity data;
    using the similarity data to generate data association results corresponding to a best matching between the object data in the previous image frame and the object detection results from the current image frame;
    causing state transitions in finite state machines for each object according to the data association results; and
    providing as an output object tracking output data corresponding to the states of the finite state machines for each object.

8. The method of claim 7 including creating a finite state machine for each new object detected in the object detection results, the finite state machine for each object representing a current object detection state of a plurality of possible object detection states for a corresponding object.

9. The method of claim 7 including generating the similarity data using motion feature similarity and appearance feature similarity.

10. The method of claim 7 including generating the similarity data using motion feature similarity based on a prediction of a Kalman filter and a detected object bounding box position.

11. The method of claim 7 including generating the data association results based on three kinds of results: matched object data with object detection results, unmatched object data, and unmatched object detection results.

12. The method of claim 7 wherein the finite state machines for each object include states from the group consisting of: initialized, tracked, lost, and removed.

13. A non-transitory machine-useable storage medium embodying instructions which, when executed by a machine, cause the machine to:
    receive image frame data from at least one camera associated with an autonomous vehicle;
    generate similarity data corresponding to a similarity between object data in a previous image frame compared with object detection results from a current image frame;
    maintain a plurality of different templates for each object in the object data, the plurality of different templates for each object corresponding to different appearance features for each object as extracted from the object detection results;
update the plurality of templates for each object based on the similarity data;
use the similarity data to generate data association results corresponding to a best matching between the object data in the previous image frame and the object detection results from the current image frame;
cause state transitions infinite state machines for each object according to the data association results; and
provide as an output object tracking output data corresponding to the states of the finite state machines for each object.

14. The non-transitory machine-useable storage medium of claim 13 being further configured to create a finite state machine for each new object detected in the object detection results, the finite state machine for each object representing a current object detection state of a plurality of possible object detection states for a corresponding object.

15. The non-transitory machine-useable storage medium of claim 13 being further configured to generate the similarity data using motion feature similarity and appearance feature similarity.

16. The non-transitory machine-useable storage medium of claim 13 being further configured to generate the similarity data using motion feature similarity based on a prediction of a Kalman filter and a detected object bounding box position.

17. The non-transitory machine-useable storage medium of claim 13 being further configured to generate the data association results based on three kinds of results: matched object data with object detection results, unmatched object data, and unmatched object detection results.

18. The non-transitory machine-useable storage medium of claim 13 wherein the finite state machines for each object include states from the group consisting of: initialized, tracked, lost, and removed.

* * * * *